(12) United States Patent
Kim et al.

(10) Patent No.: US 6,173,110 B1
(45) Date of Patent: Jan. 9, 2001

(54) MAGNETIC RECORDING AND REPRODUCTION APPARATUS HAVING A RECORDING CHARACTERISTIC CORRECTION FUNCTION OF A VIDEO SIGNAL

(75) Inventors: Chul-Min Kim, Anyang (KR); Masamitsu Seki, Tokyo (JP)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/086,067

(22) Filed: May 29, 1998

(30) Foreign Application Priority Data

May 31, 1997 (KR) .................................................. 97-22433

(51) Int. Cl.$^7$ .................................................. H04N 9/793
(52) U.S. Cl. .................................................. 386/9; 386/44
(58) Field of Search .................................. 386/10, 9, 13, 386/26, 44, 1; H04N 9/793

(56) References Cited

U.S. PATENT DOCUMENTS

| 5,083,211 | 1/1992 | Dugan et al. ........................ 358/316 |
| 5,579,119 | * 11/1996 | Mimura ..................................... 386/9 |
| 5,598,273 | * 1/1997 | Kurisaki et al. ......................... 386/9 |

FOREIGN PATENT DOCUMENTS

| 0 481 824 | 4/1992 | (EP) ................................. G11B/5/02 |
| 0 579 198 | 1/1994 | (EP) ................................. G11B/5/035 |

* cited by examiner

Primary Examiner—Huy Nguyen
(74) Attorney, Agent, or Firm—Sughrue, Mion, Zinn, Macpeak & Seas, PLLC

(57) ABSTRACT

A magnetic recording and reproduction apparatus corrects recording characteristics of a video signal. The apparatus comprises a luminance test signal generator for generating a frequency-modulated luminance test signal using a predetermined voltage, and a chroma test signal generator for generating a chroma test signal having a lower frequency. A recording level adjuster respectively adjusts levels of the frequency-modulated luminance test signal and the chroma test signal based on corresponding luminance and chroma recording levels. A recording unit mixes signals level-adjusted by the recording level adjuster to record a mixed test signal on a magnetic tape. A readout and preamplifying unit reads out the mixed test signal from the magnetic tape and preamplifies the read-out signal. A controller determines an optimal luminance recording level and an optimal chroma recording level to record a video signal on the magnetic tape based on the mixed test signal, and supplies the determined luminance recording level and chroma recording level to the recording level adjusting means. Accordingly, the apparatus sets optimal recording levels of the video signal capable of maximizing enhancement of the performance of the tape within a short period of time, and records the video signal, thereby improving a signal-to-noise ratio of the luminance signal and the color signal.

11 Claims, 1 Drawing Sheet

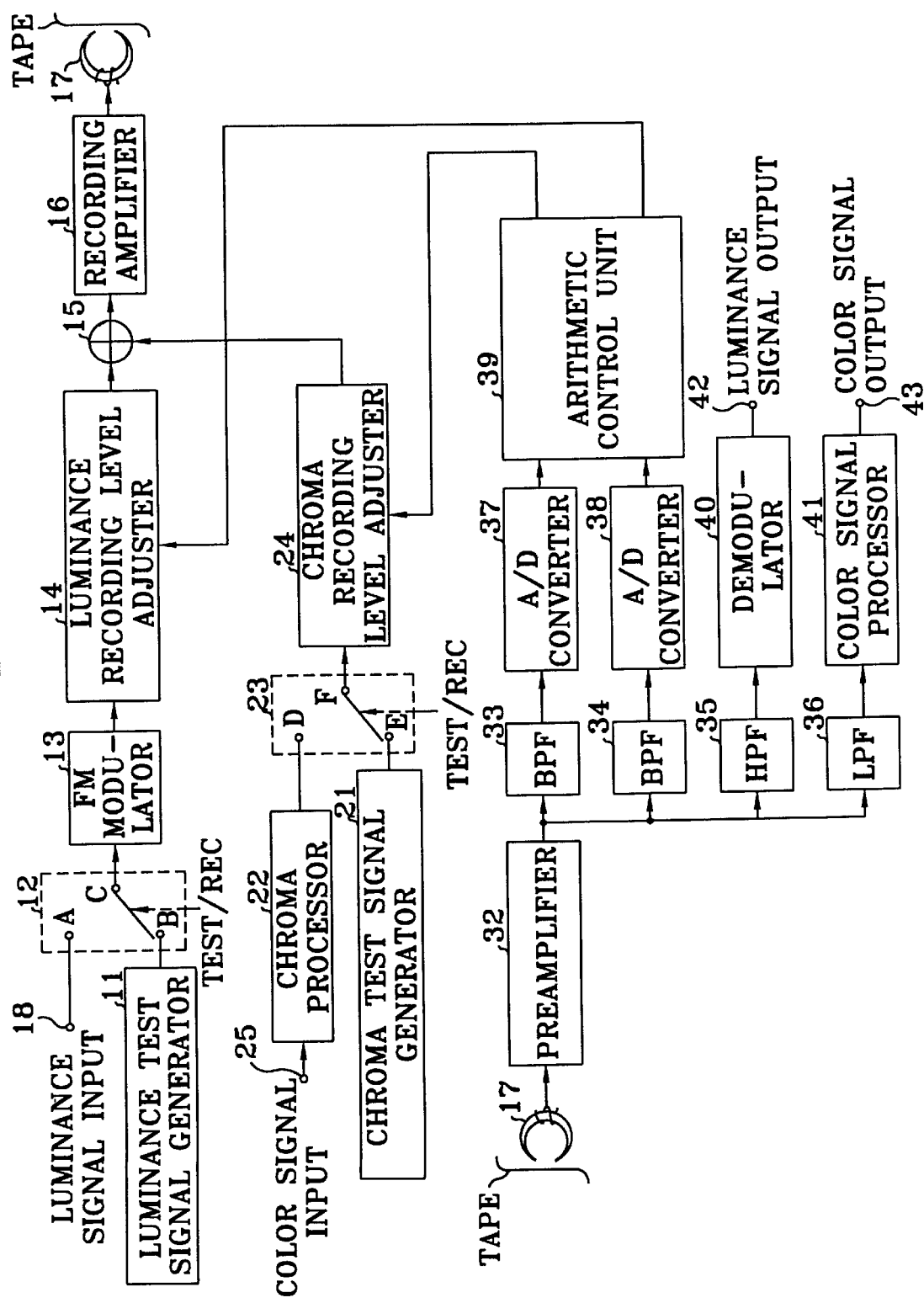

MAGNETIC RECORDING AND REPRODUCTION APPARATUS HAVING A RECORDING CHARACTERISTIC CORRECTION FUNCTION OF A VIDEO SIGNAL

BACKGROUND OF THE INVENTION

1. Field of the Invention

The present invention relates to a magnetic recording and reproduction apparatus for recording on and reproducing a video signal from a magnetic tape. More particularly, it relates to a magnetic recording and reproduction apparatus having a video signal recording characteristic correction function capable of recording the video signal in an optimal recording state by testing a characteristic of a magnetic tape and adjusting a recording characteristic according to the tested characteristic.

2. Discussion of the Related Art

Since a video signal which is input to a magnetic recording and reproduction apparatus, such as a video tape recorder (VTR), has a frequency band of 30 Hz to 4.2 MHz, it is difficult to directly record the video signal on a magnetic tape. Therefore, the magnetic recording and reproduction apparatus modulates the input video signal to alter the frequency band of the video signal. Modulation methods, such as amplitude modulation (AM), frequency modulation (FM) and phase modulation, have been used to modulate the input video signal.

The magnetic recording and reproduction apparatus mainly uses a method for frequency-modulating the an input video signal's luminance signal that is appropriate to the magnetic recording channel. The input video signal's chroma signal is converted to a low frequency band, and then mixed with the frequency-modulated luminance signal to be recorded on the magnetic tape.

Since the chroma signal is recorded on the tape in a state of being mixed with the luminance signal, it is similar to a BIAS recording in which the chroma signal frequency becomes small and the luminance signal frequency becomes large. When the mixed signal is recorded on and reproduced from the tape, the luminance and chroma signals are recorded together with an interference component involving third-order distortion.

The interference component involving third-order distortion degrades the picture quality of a reproduced image. The interference component is represented as $YC^2 SIN(\omega y - 2\omega c)t$, in which Y is the magnitude of a luminance carrier signal, C is the magnitude of a chroma carrier signal, ωy is an angular frequency of the luminance carrier signal and o)c is an angular frequency of the chroma carrier signal, and t is time. The interference component is demodulated along with the luminance signal component, and appears on a screen in the form of dot interference having an angular frequency of 2 ωc. Such interference is commonly called cross beat.

In the meanwhile, magnetic tapes have large characteristic deviations due to a difference in magnetic force, and are classified into several grades of tape performance based on the characteristic deviations. Also, heads contribute to characteristic deviation by more than approximately 30%, according to the head's structure and magnetic materials.

As described above, magnetic characteristics of the magnetic tape vary even within a specified range for a standard magnetic recording and reproduction apparatus. Accordingly, there is a drawback in that a video signal can not be properly recorded to comply with the characteristic of the tape.

SUMMARY OF THE INVENTION

In order to solve the problem, an object of the present invention is to provide a magnetic recording and reproduction apparatus having a video signal recording characteristic correction function, capable of recording the video signal in an optimal recording state by testing a characteristic of the tape and adjusting a recording characteristic according to the tested characteristic.

To accomplish the above object of the present invention, there is provided a magnetic recording and reproduction apparatus for recording on and reproducing a video signal from a magnetic tape. The magnetic recording and reproduction apparatus comprises:

a luminance test signal generator for generating a frequency-modulated luminance test signal using a predetermined voltage; a chroma test signal generator for generating a chroma test signal having a lower frequency; a recording level adjusting unit for respectively adjusting levels of the frequency-modulated luminance test signal and the chroma test signal based on corresponding a luminance recording level and a chroma recording level; a recording unit for mixing signals level-adjusted by the recording level adjusting unit to record a mixed test signal on the magnetic tape; a readout and preamplifying unit for reading out the mixed test signal from the magnetic tape and preamplifying the read-out signal; a control unit for adjusting the luminance recording level and the chroma recording level in the recording level adjusting unit based on the mixed test signal applied from the readout and preamplifying unit, determining an optimal luminance recording level and an optimal chroma recording level to record a video signal on the magnetic tape, and supplying the determined luminance recording level and chroma recording level to the recording level adjusting unit.

BRIEF DESCRIPTION OF THE DRAWING

A preferred embodiment is described below with reference to the FIGURE, which is a block diagram showing a magnetic recording and reproduction apparatus having a recording characteristic correction function for a video signal according to a preferred embodiment of the present invention.

DETAILED DESCRIPTION OF THE PREFERRED EMBODIMENT

A preferred embodiment of the present invention will be described below in more detail with reference to the accompanying drawing.

For a tape characteristic test mode, a magnetic recording and reproduction apparatus enters a pause/still state in which the tape temporarily does not travel, and a constant tape tension is maintained. A luminance test signal generator 11 generates a luminance test signal of a predetermined voltage. In a first switch 12, a movable contactor C is connected to a fixed contactor B under the control of a controller (not shown), to output the luminance test signal generated by the luminance test signal generator 11 to an FM modulator 13. The FM modulator 13 frequency-modulates the luminance test signal to generate a frequency-modulated luminance test signal. The frequency-modulated luminance test signal is applied to a mixer 15 via a luminance recording level adjuster 14. The luminance recording level adjuster 14 has, as a default value, a value which is preset by taking the characteristic of a magnetic tape into consideration.

A chroma test signal generator 21 generates a chroma test signal having a predetermined low frequency. A movable contactor F in a second switch 23 is connected to a fixed contactor E under the control of a controller (not shown), to output the chroma test signal supplied from the chroma test signal generator 21, to a chroma recording level adjuster 24. The chroma test signal passes through the second switch 23 and the chroma signal recording level adjuster 24, and then is applied to the mixer 15. The chroma recording level adjuster 24 has, as a default value, a value which is preset by taking the characteristic of a magnetic tape into consideration.

The mixer 15 mixes the chroma test signal with the frequency-modulated luminance test signal. The resultant mixed test signal is applied to a head 17 via a recording amplifier 16. The head 17 records the mixed test signal on a particular track of the magnetic tape.

Once the head 17 completely records the mixed test signal generated during the tape characteristic test mode, on the particular track, the magnetic recording and reproduction apparatus shown in the FIGURE again scans the particular track on which the mixed test signal was previously recorded and reads out the previously recorded signal. A preamplifier 32 amplifies the mixed test signal read out from the tape via the reproduction head 17, by a predetermined amplification factor, and outputs the amplified signal to first and second band pass filters 33 and 34. The first band pass filter 33 extracts a frequency-modulated luminance test signal from the amplified signal of the preamplifier 32. The second band pass filter 34 extracts an interference component of $YC^2SIN(\omega y - 2\omega c)t$ from the amplified signal. First and second analog-to-digital converters 37 and 38, correspondingly connected to the two band pass filters 33 and 34, convert the extracted frequency-modulated luminance test signal and interference component into a digital form, respectively, to output converted results to an arithmetic control unit 39. Such operations are iterated a predetermined number of times.

The arithmetic control unit 39 calculates an average value of the frequency-modulated luminance test data and an average value of the interference components obtained by iterating the predetermined number of times. Subsequently, the arithmetic control unit 39 calculates average frequency-modulated luminance test data and an average interference component, respectively, and calculates a ratio of the calculated averages, and then calculates a difference between the ratio and a predetermined target value.

Calculation of the difference between the ratio and the predetermined target value is initially performed using the default values. When it is finished, the arithmetic control unit 39 varies the defaulted luminance recording level in the luminance recording level adjuster 14 by a predetermined level interval, and calculates a difference between the predetermined target value and a ratio of the average frequency-modulated luminance test data and the average interference component, whenever the luminance recording level is varied. According to such a calculation operation, a luminance recording level corresponding to the minimum difference value is obtained. That is, a luminance recording level is obtained at which the maximum output is generated. The arithmetic control unit 39 sets a recording level value of the luminance recording level adjuster 14 with the luminance recording level corresponding to the maximum output.

Subsequently, the arithmetic control unit 39 varies the default chroma recording level of the chroma recording level adjuster 24 by a predetermined level interval, and calculates a ratio of average frequency-modulated luminance test data and the average interference component whenever the luminance recording level is varied. Accordingly, the difference value between the ratio and the predetermined target value is minimized. When the minimum difference value is obtained, the arithmetic control unit 39 calculates the square root of the ratio of average frequency-modulated luminance test data and the average interference component corresponding to the minimum difference value. Then, the arithmetic control unit 39 sets the calculated square root value as the chroma recording level value in the chroma signal recording level adjuster 24, and the testing mode is finished. Accordingly, a condition is set whereby it is capable of recording the video signal in the optimal state.

In the case where an externally input video signal is recorded in a normal recording mode, under the control of the controller (not shown), the movable contactor C of the first switch 12 is connected to the fixed contactor A and the movable contactor F of the second switch 23 is connected to the fixed contactor D. The FM modulator 13 frequency-modulates a luminance signal input via an input terminal 18 and selected by the first switch 12, and outputs a frequency-modulated luminance signal to the luminance recording level adjuster 14. The luminance recording level adjuster 14 adjusts the input frequency-modulated luminance signal according to the luminance recording level set by the arithmetic control unit 39, and outputs the resulting signal to the mixer 15. A chroma processor 22 converts the frequency band of a chroma signal input via an input terminal 25 into the low frequency band for recording. The low frequency chroma signal is input to the chroma recording level adjuster 24 via the second switch 23. The chroma recording level adjuster 24 level adjusts the input chroma signal according to the chroma recording level set by the arithmetic control unit 39, and outputs the resulting signal to the mixer 15. The mixer mixes the two input signals and outputs the mixed signal to the recording amplifier 16. The recording amplifier 16 amplifies the mixed signal by a predetermined amplification factor and supplies the amplified signal to the head 17 to be recorded on the tape.

In the case of a normal reproduction mode, the preamplifier 32 amplifies the video signal read out via the head 17 from the tape by a predetermined amplification factor, and outputs the amplified signal to a high pass filter 35 and a low pass filter 36. The high pass filter 35 extracts a luminance signal from the amplified signal and outputs the extracted luminance signal to a demodulator 40. The demodulator 40 demodulates the extracted luminance signal into an original signal prior to its being modulated, and outputs the demodulated signal to a luminance signal output terminal 42. The low pass filter 36 extracts the low-frequency-converted chroma signal from the amplified signal and outputs the extracted chroma signal to the color signal processor 41. The color signal processor 41 converts the input low-band-converted chroma signal into a normal color signal, and outputs the converted signal to a color signal output port 43.

As described above, a magnetic recording and reproduction apparatus of the present invention sets the optimal recording level of the video signal so it is capable of maximizing the performance enhancement of tape within a short period of time, and it records the video signal, thereby improving a signal-to-noise ratio of a luminance signal and a chroma signal.

While only a certain preferred embodiment of the invention has been specifically described herein, it will be apparent that numerous modifications may be made thereto without departing from the spirit and scope of the invention.

What is claimed is:

1. A magnetic recording and reproduction apparatus for recording on and reproducing a video signal from a magnetic tape, the magnetic recording and reproduction apparatus comprising:

a luminance test signal generator for generating a frequency-modulated luminance test signal;

a chroma test signal generator for generating a chroma test signal;

a recording level adjuster for adjusting a level of the frequency-modulated luminance test signal and a level of the chroma test signal based on a luminance recording level and a chroma recording level, respectively;

a recording unit for mixing the signals level-adjusted by the recording level adjuster to record a mixed test signal on the magnetic tape;

a readout and preamplifying unit for reading the mixed test signal from the magnetic tape and preamplifying the mixed test signal read from the magnetic tape;

a first band pass filter for filtering the mixed test signal output from the readout and preamplifying unit to output the frequency-modulated luminance test signal;

a second band pass filter for filtering the mixed test signal output from the readout and preamplifying unit to output an interference component involving third-order distortion of the magnetic tape; and a control unit for adjusting the luminance recording level and the chroma recording level in the recording level adjuster based on the frequency-modulated luminance test signal output from the first band pass filter and the interference component output from the second band pass filter, determining an optimal luminance recording level and an optimal chroma recording level to record the video signal on the magnetic tape, and supplying the determined luminance recording level and chroma recording level to the recording level adjuster.

2. The magnetic recording and reproduction apparatus according to claim 1, wherein said luminance test signal generator comprises:

a signal generator for generating a luminance test signal of a predetermined voltage; and an FM modulator for frequency-modulating the luminance test signal generated by the signal generator.

3. The magnetic recording and reproduction apparatus according to claim 2, further comprising:

a first switch, including a first fixed contactor connected to an output end of the signal generator, a second fixed contactor for an externally input luminance signal and a first movable contactor being selectively connected to one of the first fixed contactor and the second fixed contactor, for supplying the luminance test signal from the signal generator to the FM modulator while in a mode of estimating recording characteristics of the magnetic tape;

a chroma processor for converting an externally input chroma signal into a signal of a predetermined low frequency band; and a second switch, including a third fixed contactor connected to an output end of the chroma test signal generator, a fourth fixed contactor being connected to an output end of the chroma processor and a second movable contactor being selectively connected to one of the third fixed contactor and the fourth fixed contactor, for supplying the chroma test signal from the chroma test signal generator to the recording level adjuster while in a mode of estimating recording characteristics of the magnetic tape.

4. The magnetic recording and reproduction apparatus according to claim 1, wherein said recording level adjuster comprises:

a luminance recording level adjuster for adjusting the frequency-modulated luminance test signal according to the luminance recording level supplied from the control unit and outputting a level-adjusted luminance signal; and a chroma recording level adjuster for adjusting the chroma test signal according to the chroma recording level supplied from the control unit and outputting a level-adjusted chroma signal.

5. The magnetic recording and reproduction apparatus according to claim 1, further comprising:

a first analog-to-digital (A/D) converter for analog-to-digital converting the frequency-modulated luminance test signal from the first band pass filter to generate frequency-modulated luminance test data; and a second A/D converter for converting the interference component output from the second band pass filter into a digital form, wherein said control unit comprises an arithmetic control unit for controlling the luminance recording level and the chroma recording level output from the recording level adjuster based on the signals output from the first and second A/D converters.

6. The magnetic recording and reproduction apparatus according to claim 5, wherein said arithmetic control unit:

(a) changes a luminance recording level by a predetermined luminance interval, while maintaining a chroma recording level;

(b) calculates a ratio between an average of frequency-modulated luminance test data and a corresponding average interference component, with respect to each of the luminance recording levels in (a);

(c) determines as the optimal luminance recording level a luminance recording level corresponding to a minimum value of differences between each of the ratios obtained in (b) and a first predetermined value; and (d) changes a chroma recording level by a predetermined chroma interval, while maintaining the optimal luminance recording level determined in (c);

(e) calculates a ratio between the average frequency-modulated luminance test data and the corresponding average interference component, with respect to each of the chroma recording levels in (d); and (f) determines as the optimal chroma recording level a chroma recording level corresponding to a minimum value of the differences between each of the ratios obtained in (b) and a second predetermined value.

7. The magnetic recording and reproduction apparatus according to claim 5, further comprising:

a high pass filter for high-pass-filtering the mixed test signal output from the readout and preamplifying unit to output a reproduced frequency-modulated luminance signal;

a low pass filter for low-pass-filtering the mixed test signal output from the readout and preamplifying unit to output a reproduced chroma signal;

a demodulator for demodulating the reproduced frequency-modulated luminance signal output from the high pass filter to generate a luminance signal; and a color signal processor for processing the reproduced chroma signal output from the low pass filter to generate a color signal.

8. The magnetic recording and reproduction apparatus according to claim 1, wherein the luminance test signal generator generates the frequency-modulated luminance test signal by using a predetermined voltage, and the chroma test signal has a predetermined low frequency.

9. The method of recording and reproducing a signal on a magnetic medium, the method comprising:

(a) generating a luminance test signal;

(b) generating a chroma test signal;

(c) mixing the luminance and chroma test signal, thereby generating a mixed test signal;

(d) recording the mixed test signal on the magnetic medium;

(e) reproducing the mixed test signal recorded on the magnetic medium and generating a reproduced luminance test signal and an interference component involving third-order distortion of the magnetic medium from the reproduced mixed test signal; and (f) adjusting a luminance recording level and a chroma recording level based on the reproduced luminance test signal and the interference component, and thereby generating an adjusted luminance signal and an adjusted chroma signal.

10. The method according to claim 9, wherein said adjusting a luminance recording level comprises:

(f1) converting the reproduced luminance test signal into a plurality of luminance test data;

(f2) extracting a plurality of interference components from the reproduced mixed test signal a plurality of times;

(f3) calculating a ratio of an average of the plurality of luminance test data and an average of the plurality of interference components;

(f4) calculating a difference between the ratio calculated in (f3) and a predetermined target value; and (f5) adjusting the luminance recording level to a recording level based on the difference calculated in (f4).

11. The method according to claim 10, wherein said adjusting a chroma recording level further comprises:

(f6) calculating a square root of the ratio of the average of the plurality of luminance test data and the average of the plurality of interference components, when a difference between the ratio of the average of the plurality of luminance test data and the average of the plurality of interference components is minimized; and (f7) adjusting the chroma recording level to the square root calculated in (f6).

* * * * *